(12) United States Patent
Matsubara (10) Patent No.: US 6,277,486 B1
(45) Date of Patent: Aug. 21, 2001

(54) CERMET TOOL

(75) Inventor: Masaru Matsubara, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/282,166

(22) Filed: Mar. 31, 1999

(30) Foreign Application Priority Data

Mar. 31, 1998 (JP) .................................................. 10-105669

(51) Int. Cl.$^7$ ........................................................ B32B 7/02
(52) U.S. Cl. .............................. 428/336; 51/295; 51/307; 51/309; 75/238; 75/244; 428/469; 428/472; 428/698
(58) Field of Search .................................... 428/469, 472, 428/698, 336; 75/238, 244; 51/295, 307, 309

(56) References Cited

U.S. PATENT DOCUMENTS

| | | | | |
|---|---|---|---|---|
| 3,958,070 | * | 5/1976 | Schintlmeister et al. ............. | 117/127 |
| 4,447,263 | * | 5/1984 | Sugizawa et al. .................... | 428/469 |
| 4,556,607 | * | 12/1985 | Sastri ................................... | 428/627 |
| 4,902,395 | * | 2/1990 | Yoshimura ........................... | 428/698 |
| 5,336,292 | * | 8/1994 | Weinl et al. .......................... | 75/243 |
| 5,376,466 | * | 12/1994 | Koyama et al. ..................... | 428/698 |
| 5,682,590 | * | 10/1997 | Weinl ................................... | 75/238 |
| 6,004,371 | * | 12/1999 | Rolander et al. .................... | 75/238 |

FOREIGN PATENT DOCUMENTS

| | | | |
|---|---|---|---|
| 0 492 059 | * | 7/1992 | (EP) . |
| 9-264813 | | 10/1997 | (JP) . |

OTHER PUBLICATIONS

JP 5098383A and its English abstract (no date).
JP 53052212A and its English abstract (no date).

* cited by examiner

Primary Examiner—Archene Turner
(74) Attorney, Agent, or Firm—Dougherty & Troxell (57) ABSTRACT

A cermet tool is made up of a binder metallic phase forming component of Ni or Ni and Co and a hard phase including a hard phase metallic element component of Ti as its main part and one or more of an additional metallic compound selected from V, Cr, Zr, Nb, Mo, Hf, Ta and W. A surface coating layer is formed on the surface of the cermet. The surface coating layer satisfies at least one of the appearance lightness Vs of 6 or more and the saturation Cs of 4 or more. When wear of a tip of a cermet tool proceeds, that part changes its color to a blackish tone (corresponding, for example, to Vs of from 4 to 1 and Cs of from N to 3). By adjusting the appearance lightness and the saturation of the surface coating layer to the ranges described above, a worn part and a non-worn part are easily distinguished by the naked eyes based on the difference in lightness or hue. As a result, distinction of a spent tool and judgement of the life of the tool can be easily conducted.

14 Claims, 5 Drawing Sheets

(PLAN VIEW)

FIG. 5a

(LEFT SIDE VIEW)   (FRONT VIEW)

FIG. 5b   FIG. 5c   $\delta = 6°$

O: CENTRAL AXIS OF MATERIAL TO BE CUT W

D: STRAIGHT LINE PASSING THE CENTER IN THICKNESS DIRECTION OF TEST PIECE PARALLEL TO ONE DIAGONAL LINE OF PRIMARY PLANE 1c' (CROSSING O)

E: POINT OF SECTION OF D AND THE OUTER CIRCUMFERENTIAL SURFACE OF MATERIAL TO BE CUT W (CUTTING POINT BY TEST PIECE)

J: STRAIGHT LINE PASSING E PERPENDICULAR TO O

K: STRAIGHT LINE PASSING THE CENTER IN THICKNESS DIRECTION OF TEST PIECE PARALLEL TO THE OTHER DIAGONAL LINE OF PRIMARY PLANE 1c'

$\varphi$: CROSSING ANGLE BETWEEN J AND D $\delta$: TORSION ANGLE OF K WITH RESPECT TO O

CERMET TOOL

FIELD OF THE INVENTION

The present invention relates to a cermet tool and a process for producing the same.

BACKGROUND OF THE INVENTION

A cermet sintered body, which comprises a hard phase mainly comprising a carbonitride of Ti and a 4a, 5a, 6a Group element component other than Ti (V, Cr, Zr, Nb, Mo, Hf, Ta and W), the hard phase being bound with a binder metallic phase mainly comprising Ni and/or Co is known. Such bodies have excellent plastic deformation resistance, etc. in comparison to hard alloys which have also been conventionally used. Therefore, the sintered bodies are replacing the super-hard alloys as a main stream cutting tool.

However, the cermet sintered bodies described above generally exhibit an appearance having a near black hue or color. Therefore, when wear proceeds as a tool is used, it is difficult to distinguish between a worn part and a non-worn part with the naked eye. Accordingly, problems may occur in that machining may proceed even when the life of the tool has expired. This may result in damage to the material which is being cut. On the other hand, a tool that can still be used may be replaced due to a misjudgment in the life of the tool by an operator.

An object of the present invention is to provide an improved cermet tool wherein the differences in color or hue between a worn part and non-worn part can be easily seen by the naked eye, so that the time at which the life of the tool is expired can readily be determined.

BRIEF SUMMARY OF THE INVENTION

In essence, a cermet tool according to the present invention comprises a binder metallic phase, a hard phase, and a surface coating. The binder metallic phase comprises Ni, or Ni and Co (hereinafter referred to as a binder metallic phase forming component). The hard phase contains a metallic element component of the phase (hereinafter referred to as a hard phase metallic element component), Ti constituting its main part, and one or more of an additional metallic element component M. The metallic element component M is selected from the group consisting of V, Cr, Zr, Nb, Mo, Hf, Ta and W. The hard phase mainly comprises a carbonitride of the hard phase metallic element component.

The surface coating layer is formed on a surface outermost part of the cermet. The surface coating layer mainly comprises one or more metallic elements selected from Ti, Al, V, Cr, Zr, Nb, Mo, Hf, Ta and W with Ti being necessary as a main component. The surface coating layer includes at least one of a carbide, a nitride and a carbonitride of the metallic element or elements.

This surface coating layer also has an appearance lightness Vs and a saturation Cs in lightness defined in the Japanese Industrial Standard JIS Z8721 satisfying at least one of Vs of 6 or more and Cs of 4 or more. An English language translation of the Japanese Industrial Standard JISZ 8721 has been published and is available from the Japanese Standards Association 1-24 Akasaka 4 Minato-ku, Tokyo 107, Japan.

In a second embodiment of the invention, the surface coating layer has an appearance exhibiting a substantially achromatic color or chromatic color having a hue range of from 5 PB to 5 Y via 5 RP on a hue circle defined in JIS Z8721. The Japanese Industrial Standard JIS Z8721 is a color system wherein color notation and value are defined by number and alphabet and is incorporated in its entirety by reference. The color system corresponds to the Munsell system.

The invention will now be described in connection with the following figures.

BRIEF DESCRIPTION OF THE DRAWINGS

FIG. 5 a, b and c are explanatory diagrams showing the relationship of the position of the test piece 1 and the material to be cut.

DETAILED DESCRIPTION OF THE PREFERRED EMBODIMENTS

A cermet tool 1 as illustrated in the figures includes a binder metallic phase and a hard phase with a surface coating or layer 2 (see FIG. 2) forming an outermost surface of the cermet tool 1. In this embodiment of the invention, the binder metallic phase is mainly Ni or Ni and Co and may be referred to hereinafter as a binder metallic phase forming component.

The hard phase in accordance with a first embodiment of the invention contains a metallic element component which may be referred to hereinafter as a hard phase metallic element component. That hard phase metallic element component includes Ti as its main part and one or more of an additional metallic element M. This metallic element M is selected from the following elements, V, Cr, Zr, Nb, Mo, Hf, Ta and W. This hard phase is mainly a carbonitride of the hard phase metallic element component.

The cermet tool in accordance with the first embodiment of the invention also includes a surface coating layer which forms an outermost surface or part of the cermet tool 1. The surface coating layer 2 includes Ti as a necessary main component and may include one or more of Al, V, Cr, Zr, Ni, Mo, Hf, Ta and W, and includes at least one of a carbide, a nitride and a carbonitride of the metallic element or elements.

It has also been found that one of the following concepts may be used to modify the first embodiment of the invention.

(A) The surface coating layer 2 which is formed on a surface outermost part of the cermet, is made of essentially the same material as the hard phase. However, the weight content of the binder metallic phase forming component in the surface coating layer 2 is smaller than the average weight content of the binder metallic phase forming component throughout the body of the cermet tool. In addition, the weight content WB1 of the binder metallic phase forming component in the surface coating layer of the cermet tool 1 and a weight content WB2 of the binder metallic phase forming component of a main body part, which is a residual part other than the surface coating layer, satisfies the following formula:

$$0.1 \leq WB1/WB2 \leq 0.7$$

(B) In a further modification of the first embodiment of the invention, the surface coating layer is formed on a surface outermost part of the cermet and mainly comprises the same material as the hard phase. However, a weight content of the binder metallic phase forming component in the surface coating layer 2 is smaller than an average weight content of the binder metallic phase forming component throughout the body 3 of the cermet tool. In addition, a weight content WR1 of the hard phase metallic element component and a weight content WB1 of the binder metallic phase forming component in the surface coating layer 2 of the cermet tool 1 and a weight content WR2 of the hard phase metallic element component and a weight content WB2 of the binder metallic phase forming component of a main body part 3, which is other than the surface coating layer 2, satisfies the following formulas:

$$0.005 \leq WB1/WR1 \leq 0.14$$

$$0.05 \leq WB2/WR2 \leq 0.2$$

(C) In (A) or (B) described above, the respective metallic element components constituting the hard phase metallic element component in the surface coating layer and the main body part exhibit content ratios substantially the same as each other.

(D) In one of (A) to (C) described above, a thickness of the surface coating layer is adjusted to a range of from 0.5 to 5 $\mu$m.

(E) In one of (A) to (D) described above, an appearance of the surface coating layer does not exhibit a high degree of metallic gloss.

In the cermet tool of the first embodiment of the present invention, the surface coating layer 2 is formed on a surface outermost part of the cermet tool 1 and constitutes an important part of the tool. This surface coating layer 2 has an appearance lightness Vs and a saturation Cs in lightness defined in JIS Z8721 satisfying at least one of Vs of 6 or more and Cs of 4 or more. When wear of a tip of a cermet tool proceeds, that part changes its color to a blackish tone (corresponding, for example, to Vs of from 4 to 1 and Cs of from N to 3). In the present invention, in which the appearance lightness and the saturation of the surface coating layer are adjusted to the ranges described above, a worn part and a non-worn part are easily distinguished by the naked eyes based on the difference in lightness or hue. As a result, distinction of a spent tool and judgement of the life or the tool can be easily seen.

When the appearance lightness Vs of the surface coating layer becomes less than 6 or its saturation Cs becomes less than 4, it is difficult to distinguish a worn part (for example, a spent corner part) and a non-worn part of the cermet tool by the naked eyes. Preferably, when the Vs is 7 or more, and the Cs is 5 or more, distinction between a worn part and a non-worn part can be easily seen.

The surface coating layer 2 may have an appearance exhibiting a substantially achromatic color or a chromatic color having a hue range of from 5 PB to 5 Y via 5 RP on a hue circle defined in JIS Z8721. By this feature, distinction between a worn part and a non-worn part can be easily seen. For example, even when the lightness of the surface coating layer is in the same level as that of the spent corner part, because the saturation of the spent corner part becomes 3 or less as described above, the surface coating layer 2 can be distinguished by having a saturation Cs of 4 or more. The "substantially achromatic color" used herein means a color having a saturation Cs of 1 or less defined in JIS Z8721.

In the cermet tool in accordance with the present invention, the content of the Ti component with respect to the total hard phase metallic component is preferably between 50 to 80% by weight. When the content of the Ti component is less than 50% by weight, it leads to deterioration of the plastic deformation resistance or the wear resistance of the cermet tool. On the other hand, if the content of the Ti component exceeds 80% by weight, there may be a case in that the toughness of the cermet tool is reduced. Accordingly, the content of the Ti component is preferably between 60 to 70% by weight.

The content of the additional metallic element component M (hereinafter referred to as an M component) is preferably from 20 to 50% by weight. When the content of the M component exceeds 50% by weight, the Ti component becomes less than 50%, which leads to deterioration of the plastic deformation resistance or wear resistance of the cermet tool. On the other hand, if the content of the M component is less than 20% by weight, the Ti component becomes excessive and the toughness of the cermet tool deteriorates. Therefore, the content of the M component is preferably from 30 to 40% by weight.

In order that the Ti component and the M component described above are effectively incorporated as elements of the carbonitride phase, the content of the carbon component C in the cermet is suitably from 7 to 12% by weight, and preferably from 8 to 10% by weight. Due to the same reason, the content of the nitrogen N component in the cermet is suitably from 3 to 8% by weight, and preferably from 5 to 6% by weight. Furthermore, assuming that the content of the carbon or C component in the cermet is represented by x, and the content of the nitrogen or N component is represented by y, the value of y/(x+y) is adjusted within the range of more than 0.3 but less than 0.5.

The surface coating layer 2 can be formed by a gas phase film formation method, such as a physical vapor deposition method (an ion plating method, a sputtering method, etc.) and a chemical vapor deposition method.

In the modification as described in (A) above, a surface coating layer 2 is formed on a surface outermost part of the cermet tool and forms an important part of the tool. In this case, the surface coating layer 2 mainly comprises the same hard phase as in the main body part inside, and in which the weight content of the binder metallic phase forming component is smaller than the average weight content of the binder metallic phase forming component throughout the cermet (or the weight content in the main body part). In addition, the weight content WB1 of the binder metallic phase forming component in the surface coating layer of the cermet tool (reflecting the amount of the binder metallic phase in the surface coating layer) and a weight content WB2 of the binder metallic phase forming component of the main body part (reflecting the amount of the binder metallic phase in the main body part) is adjusted to be $0.1 \leq WB1/WB2 \leq 0.7$.

Since the surface coating layer has a smaller content of the binder metallic phase than the main body part, its hardness is higher than the main body part. On the other hand, since a suitable amount of the binder metallic phase is present as converted to WB1/WB2 of 0.1 or more, spalling of the hard phase is unlikely, and excellent characteristics are exhibited for toughness. As a result, the wear resistance of the tool can be greatly improved. Furthermore, the surface coating layer described above has an advantage in that it can be easily formed by modifying the surface of the cermet itself by the method described later, as different from a so-called post-formation type that is formed by using a raw material not originated from the compositional component of the cermet by another step, such as the conventional hard coating layer by the gas phase film forming method.

When WB1/WB2 becomes less than 0.1, the binder metallic phase in the surface coating layer is reduced to make spalling of the hard phase likely to occur, and the improvement in wear resistance of the tool becomes insufficient. On the other hand, when WB1/WB2 exceeds 0.7, the hardness of the surface coating layer is reduced, and the improvement in wear resistance of the tool similarly becomes insufficient. WB1/WB2 is preferably adjusted in a range of from 0.2 to 0.5.

In the composition (B) described above, a weight content WR1 of the hard phase metallic element component (reflecting the amount of the hard phase in the surface coating layer) and a weight content WB1 of the binder metallic phase forming component in the surface coating layer of the cermet, and a weight content WR2 of the hard phase metallic element component (reflecting the amount of hard phase in the main body part) and a weight content WB2 of the binder metallic phase forming component of a residual part (hereinafter referred to as a main body part) other than the surface coating layer are adjusted to be $0.005 \leqq WB1/WR1 \leqq 0.14$ in the side of the surface coating layer and $0.05 \leqq WB2/WR2 \leqq 0.2$ in the side of the main body part.

Since the surface coating layer has a smaller content of the binder metallic phase than the main body part, it has a higher hardness than the main body part. On the other hand, since a suitable amount of the binder metallic phase is present as converted to WB1/WR1 of 0.005 or more, spalling of the hard phase is less likely to occur, and excellent characteristics are exhibited for toughness. As a result, the wear resistance of the tool can be improved. Furthermore, the advantage in production is similar to the modification (A) described above can also be obtained.

When WB1/WR1 becomes less than 0.005 in the side of the surface coating layer, the binder metallic phase in the surface coating layer is reduced and spalling of the hard phase is likely to occur, and the improvement in wear resistance of the tool becomes insufficient. On the other hand, when WB1/WR1 exceeds 0.14, the amount of the binder metallic phase in the surface coating layer becomes excessive which makes the hardness insufficient, and the effect of improvement in wear resistance of the tool becomes insufficient. Therefore, WB1/WR1 is preferably adjusted in a range of from 0.01 to 0.11.

When WB2/WR2 becomes less than 0.05 in the side of the main body part, the binder metallic phase is reduced which makes the material weak. This leads to deterioration of chipping resistance of the cermet tool. On the other hand, when WB2/WR1 exceeds 0.2, the formed amount of the hard phase is reduced, and the wear resistance of the cermet tool becomes insufficient. Therefore, WB2/WR2 is preferably adjusted in a range of from 0.07 to 0.16.

In the modification (B), when the ratio is made to satisfy $0.1 \leqq WB1/WB2 \leqq 0.7$ (preferably $0.2 \leqq WB1/WB2 \leqq 0.5$) as similar to the modification (A), the effect of increasing the wear resistance of the cermet is further realized.

The cermet tool having the composition of (A) or (B) described above can be easily produced by the process for production described below.

In essence, the process for production incorporates mixed powder obtained by mixing hard phase raw material powder and binder metallic phase raw material powder in prescribed amounts. The mixed powder is molded into a prescribed shape. The resulting molded article is than fired at a firing temperature in a range of from 1,450 to 1,6500° C. After firing, cooling is conducted, in which an average cooling rate at least in a temperature range of from 1,450 to 1,3000° C. is from 7 to 50° C. per minute, and an atmosphere containing nitrogen and/or an inert gas (such as argon) in a partial pressure of 50 torr or more is used as a cooling atmosphere at least in that temperature range.

By firing the molded article, the hard phase is formed based on the hard phase raw material powder, and the binder metallic phase is formed based on the binder metallic phase raw material powder, to thereby form a cermet sintered body. By conducting the cooling after firing at the cooling rate in the atmosphere described above, the amount of the metallic binder metallic layer in the surface part of the cermet is decreased with the proportion of the hard phase being relatively increased, and it is modified to the surface coating layer described above.

By setting the cooling conditions after the heat treatment to those described above, the following is expected. That is, during firing, diffusion of the compositional elements of the metallic phase proceeds from the central part of the article to be fired toward the outer periphery. On cooling after completion of sintering, by introducing nitrogen and/or an inert as at a pressure higher than the prescribed value at the initial state, nitriding or carbonization of the hard particles is accelerated to cause particle growth of the hard phase in the surface part, and wettability between the hard phase and the binder metallic phase is decreased. As a result a part of the binder metallic phase is likely to be flicked out (or evaporated). Therefore, the binder metallic phase of the surface part is decreased.

According to the process described above, a tool of the present invention, in which a surface coating layer is formed on the surface of the cermet, can be easily produced by the surface modification of the cermet itself. Furthermore, because the surface modification is carried out on cooling after firing, a pretreatment such as surface polishing preceding the film formation is not necessary. As a result, the number of production steps of the tool can be effectively reduced, and the price of the tool can be lowered.

In the process described above, when the firing temperature exceeds 1,650° C., the growth of crystalline particles make it difficult to ensure the necessary strength. On the other hand, when the firing temperature is less than 1,450° C., densification of the material becomes insufficient, which leads to insufficient strength. Therefore, the firing temperature is preferably in the range of from 1,500 to 1,650° C.

On the other hand, when the cooling rate in the temperature range of from 1,450 to 1,300° C. becomes less than 70° C. per minute, it leads to the deterioration of wear resistance of the tool. It is believed that this is because the content of the metallic phase in the surface coating layer becomes excessive. When it exceeds 50° C. per minute, defects such as cracks are likely to be formed in the sintered body due to a thermal impact. Therefore, the cooling rate should be maintained at 7 to 50° C. per minute, and preferably from 10 to 30° C. per minute. The temperature range, at which the cooling rate is maintained, can be expanded to the higher temperature side than 1,450° C. (for example, to the firing temperature) or to the lower temperature side than 1,300° C.

When the partial pressure of nitrogen and/or an inert gas in the cooling atmosphere becomes less than 50 torr, the formation of the surface coating layer is insufficient, which leads to insufficient wear resistance of the tool. The partial pressure of nitrogen and/or an inert gas is more preferably 100 torr or more. Nitrogen and an inert gas each can be used singly or can be used as a mixture.

In the compositions (A) or (B) described above, the weight content WR2 of the hard phase metallic element component and the weight content WB2 of the binder metallic phase forming component of the main body part of the cermet can be adjusted by the mixing ratio of the hard phase raw material powder and the binder metallic phase raw material powder. The weight content WR1 of the hard phase metallic element component and the weight content WB1 of the binder metallic phase forming component can be adjusted by the mixing ratio described above, and also by the pressure of the atmospheric gas and/or the cooling rate upon cooling after firing. For example, in the case where WB1 (i.e., the amount of the binder metallic phase) is intended to be decreased, rapid cooling is conducted in an atmosphere of a relatively high pressure. In the case where it is intended to be increased, the inverse procedure to the above can be employed.

In the cermet of the compositions (A) or (B) produced by the process described above, the surface coating layer is formed through modification of the surface layer part of the cermet, in which the binder metallic phase is reduced. In the case where only the composition of the hard phase is compared, the content ratios among the individual metallic element components constituting the hard phase metallic element components are substantially the same as each other between the surface coating layer and the main body part. That is, the surface coating layer contains the same composition as in the main body part, but in an amount larger than the main body part, and thus a good wear resistance can be ensured.

The thickness of the surface coating layer described above is suitably in the range of from 0.5 to 5 $\mu$m. When the thickness of the surface coating layer becomes less than 0.5 $\mu$m, the improvement in wear resistance by the formation of the surface coating layer is insufficient. On the other hand, when the thickness is larger than 5 $\mu$m, it leads to a problem in that pitting occurs in the surface coating layer because the surface coating layer is brittle in comparison to the main body part. Therefore, the thickness of the surface coating layer is adjusted within the above-described range, preferably from 2 to 4 $\mu$m, and more preferably from 2.5 to 3 $\mu$m.

The hue of the appearance of the surface coating layer can be brought within the range described above by adjusting the formation conditions thereof. Furthermore, by subjecting the surface of the cermet after firing to an acid treatment, the surface coating layer can be modified. The appearance hue of the surface coating layer, for example, can be adjusted (for example, increasing the saturation) by the modification, and because of that a spent corner part can easily be distinguished. Examples of the acid that can be used include hydrochloric acid, nitric acid, aqua regia (for example, a mixture of nitric acid and hydrochloric acid with a volume mixing ratio of nitric acid/hydrochloric acid =about 1/3) and the like.

The cermet tool of the present invention is specifically described with reference to the examples below.

The raw material powders were titanium carbonitride powder having an average particle diameter of 1.5 $\mu$m (titanium carbide/titanium nitride=50/50), titanium carbide powder having an average particle diameter of 1.0 $\mu$m, titanium nitride powder having an average diameter of 1.4 $\mu$m, niobium carbide powder having an average diameter of 1.4 $\mu$m, tantalum carbide powder having an average diameter of 1.6 $\mu$m, molybdenum carbide (Mo$_2$C) powder having an average diameter of 3.3 $\mu$m, tungsten carbide powder having an average diameter of 1.6 $\mu$m, nickel powder having an average diameter of 3.0 $\mu$m, and cobalt powder having an average diameter of 1.5 $\mu$m.

The aforementioned powders were blended to have the component rations A and B shown in Table 1. The powders were mixed in a ball mill for 72 hours with acetone as a solvent. After the mixed powder was dried, it was subjected to kneading with the addition of a microwax series binder and drying, to make granuled powder by passing through a 60-mesh sieve. The granulated powder was then molded into a prescribed shape of a tool by press molding with a pressure of 1.5 ton/cm$^2$, followed by being degreased (Table 3: Samples Nos. 1 to 6, provided that Nos. 5 and 6 were outside the scope of the present invention.

Figure 1:
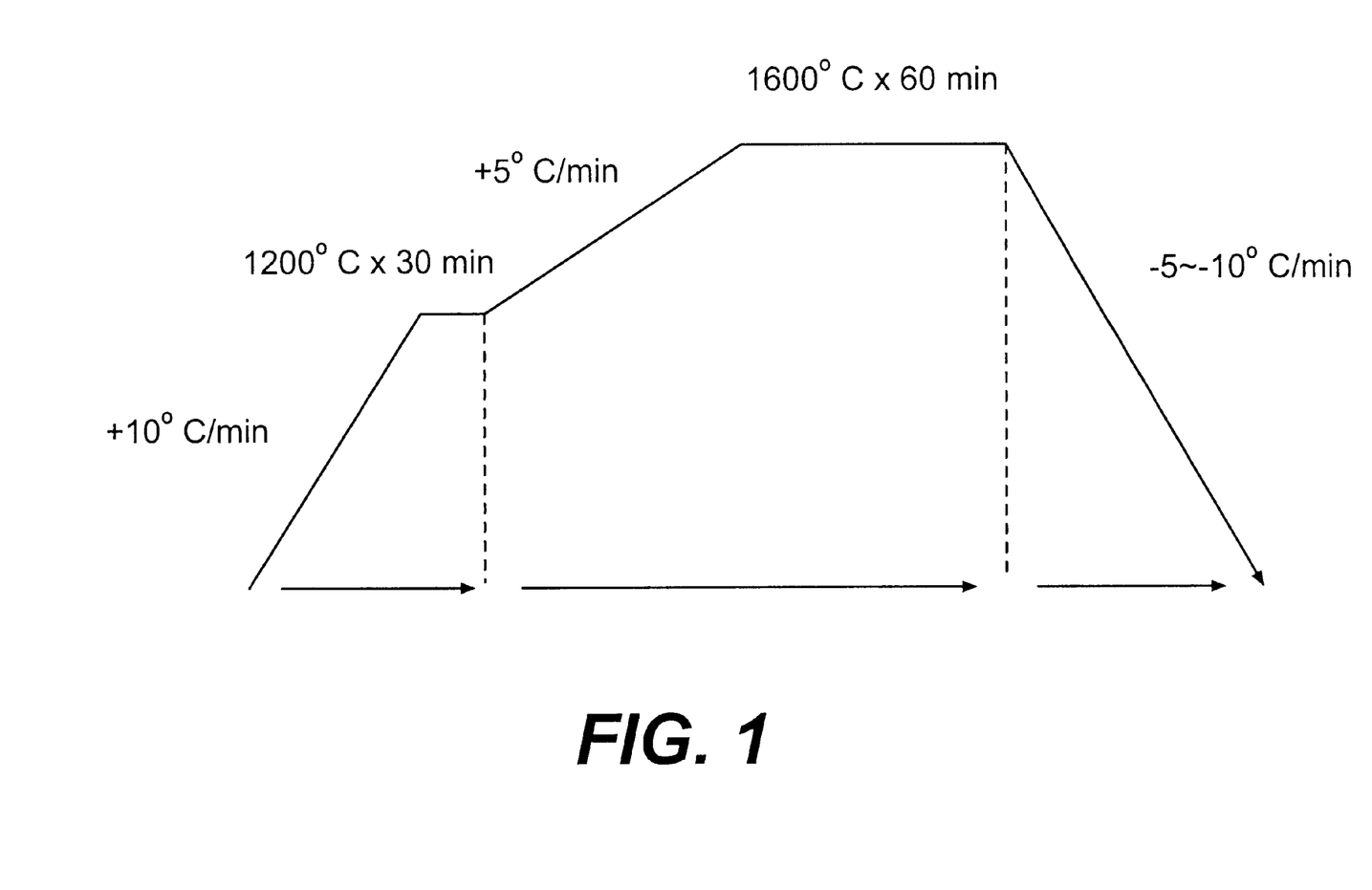
FIG. 1 is an explanatory diagram showing the sintering pattern of a cermet employed in the examples which are set forth hereinafter.

The molded articles were placed in a firing furnace, and heated from room temperature to 1,200° C. at an average temperature gradient of 10° C. per minutes, and maintained at 1,200° C. for 30 minutes for degassing, as shown in FIG. 1, while subjecting and maintaining the interior of the firing furnace under a nitrogen atmosphere of various partial pressure of 100 torr or less. Thereafter, a prescribed partial pressure of nitrogen or argon was introduced into the furnace to make the sintering atmospheres shown in Table 2, and the temperature was increased at a temperature increasing rate of 5° C. per minute, followed by maintaining at a firing temperature (maximum temperature of 1,600° C.) for 1 hour. After completing the firing and maintenance, a prescribed partial pressure of nitrogen or argon was introduced into the furnace to make the cooling atmospheres shown in Table 2, and cooling was conducted in such a manner that the average cooling rate to 1,300° C. was as shown in Table 2, to thereby produce a cermet sintered body.

After completing the cutting performance test of the cermet sintered bodies described above, the center part thereof was cut, and the cut surface was mirror polished. Then, the thickness and the composition of the surface coating layer and the composition of the main body part were measured with an EPMA (electron probe microscope by an energy dispersion type x-ray spectroscopy method) of an SEM (scanning electron microscope) in the following manner. With respect to the thickness of the surface coating layer, the cut surface of the sintered body was observed with an SEM as a secondary electron beam image (magnification: 5,000), and it was measured from the resulting structural photograph. That is, in the secondary electron beam image, because the main body part containing a large amount of binder metallic phase having a high conductivity appeared brighter than the surface coating layer containing a small amount of the binder metallic phase, the boundary therebetween could be defined by the contrast thereof.

The composition of the main body part was defined in the following manner. The center of the cut surface was enlarged by an SEM at a magnification of 5,000, and simultaneously an analysis region having a height of 30 $\mu$m and a width of 40 $\mu$m was set within the range of view. The characteristic X-ray intensity was measured with scanning an electron beam within that region, to determine the composition from the intensity ratio. Three of the analysis regions were set in different ranges of view, respectively, and an average of the composition values obtained from the three regions was finally designated as the objective composition value. On the other hand, the composition of the surface coating layer was similarly determined in such a manner that the cut surface was enlarged by an SEM at a magnification of 5,000. An electron beam probe having a diameter of 1 $\mu$m was irradiated in the range of view to measure the characteristic X-ray intensity for the respective components. The composition was then determined from the intensity ratio (in this case, the composition was calculated as an average value of the three locations). The results of measurement are shown in Table 3.

The values WB1, WR1, WB2, WR2, WB1/WB2, WB1/WR1 and WB2/WR2 calculated from those measurement results are shown in Table 4. Furthermore, the contents of the carbon and nitrogen components were measured by conducting gas analysis for the respective cermet sintered bodies, and the value y/(x+y) described above are also shown in Table 4.

Figure 2:
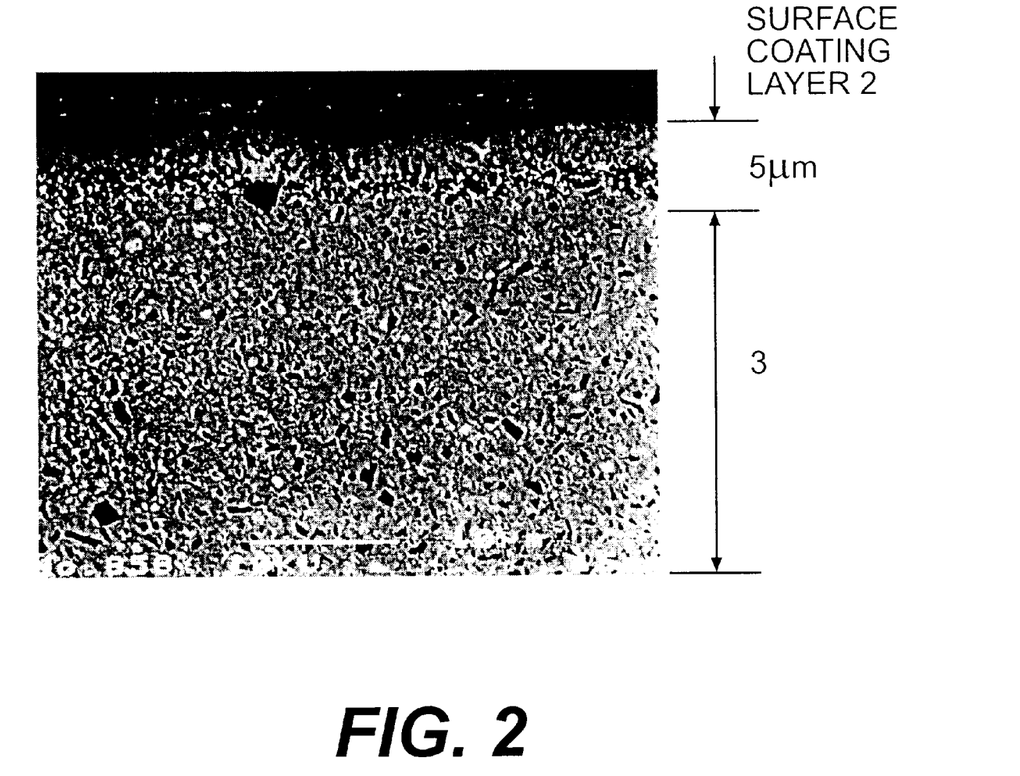
FIG. 2 is an SEM photograph showing the structure of a cermet sintered body of Sample No. 1 in the examples.

FIG. 2 is a scanning electron micrograph of the sintered body of Sample No. 1 (magnification: 5,000). The part of a depth of about 5 μm from the surface is a part that is specified as the surface coating layer 2 by the measurement described below.

The surface of the cermet sintered body produced with the same composition and firing conditions as in Sample No. 4 in Table 2 was subjected to a cleaning treatment by sand blasting. The treatment was conducted to an extent that the surface coating layer formed on cooling after firing was not completely removed but a part thereof remained. The sample after subjecting it to the cleaning treatment was also measured for the values WB1, WR1, WB2, WR2, WB1/WB2, WB1/WR1 and WB2/WR2 in the same manner as described above.

The values are shown in Table 4. Samples produced by the above process were subjected to the cleaning treatment. Films of TiN, TiCN and TiAlN respectively were formed on the surface thereof by the ion plating method to have a film thickness of 3 μm (Samples Nos. 7, 8 and 9). The ion plating is conducted by using a target of a Ti metal or a TiAl alloy as a target, and an $N_2$ or $C_2H_2$ gas as a reaction gas, with generation of an arc between the target and the material to be treated at 8000 V and 100 Å. As a comparative example, a sample, in which the surface coating layer formed on cooling after firing was completely removed, was also produced (Sample No. 10).

In order to define the appearance hue of the surface coating layer of the sintered body, the appearance color thereof was determined by comparing with color samples, the hue, lightness, and saturation of which had been known, by the naked eyes, so as to determine the appearance hue, lightness and saturation defined in JIS described above. The results are shown in Table 5.

Figure 3A:
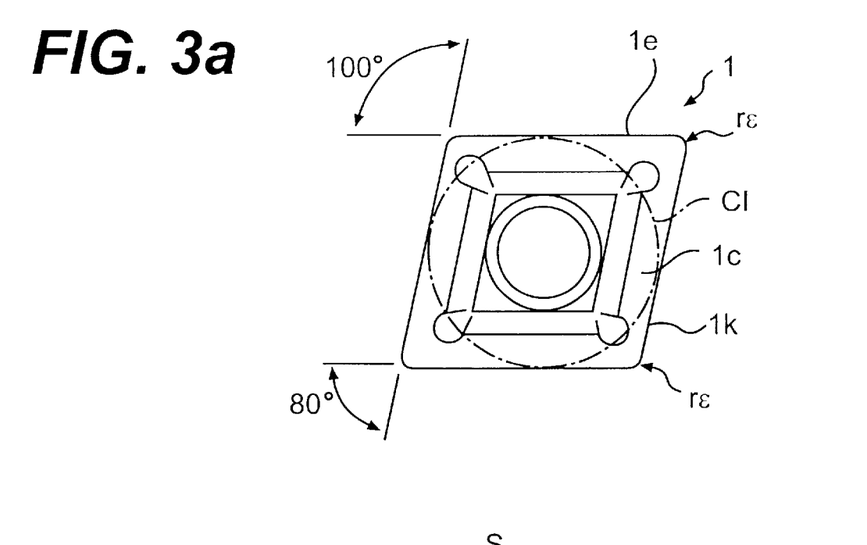
FIG. 3a, b and c are a plan view, a side view of a cermet tool used in the examples, and an enlarged side view of an edge part thereof.
Figure 3B:
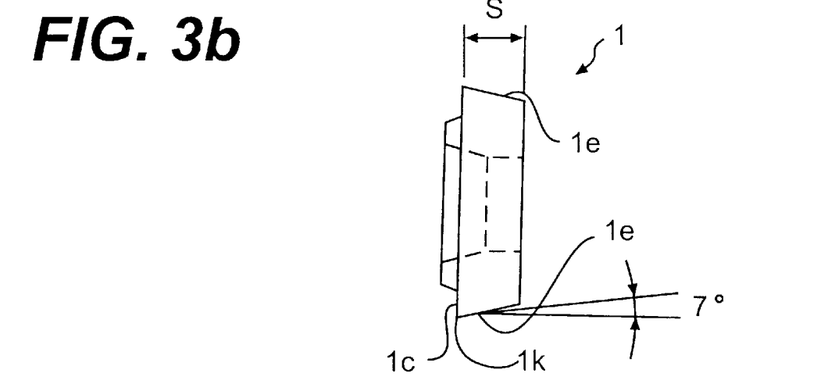
Figure 3C:
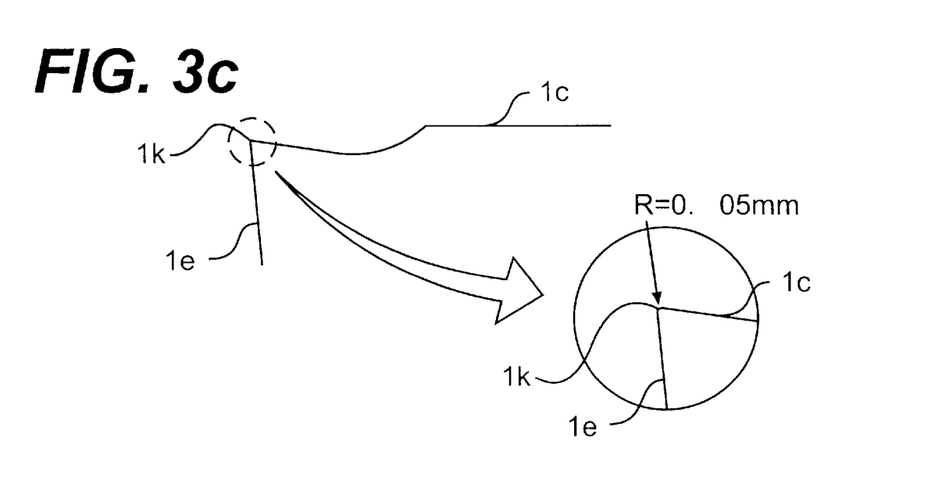

A test for the evaluation of the cutting performance when the cermets are used as a tool was conducted in the following manner. The shape of the sintered body (hereinafter referred to as a tool) was as shown in FIGS. 3a, b and c (which is defined in ISO Standard as CCMT060204EN). The tool No. 1 had a thickness S of about 2.38 mm, a diameter of an inscribed circle $C_f$ of about 6.35 mm, and a flat shape of an approximate parallelogram cross section, and the size re of radius provided at the respective corners was about 0.4 mm. The beveling part (honing) provided at the edge part 1k was formed to have the honing (R=0.05 mm) with respect to the primary plane 1c.

Figure 4A:
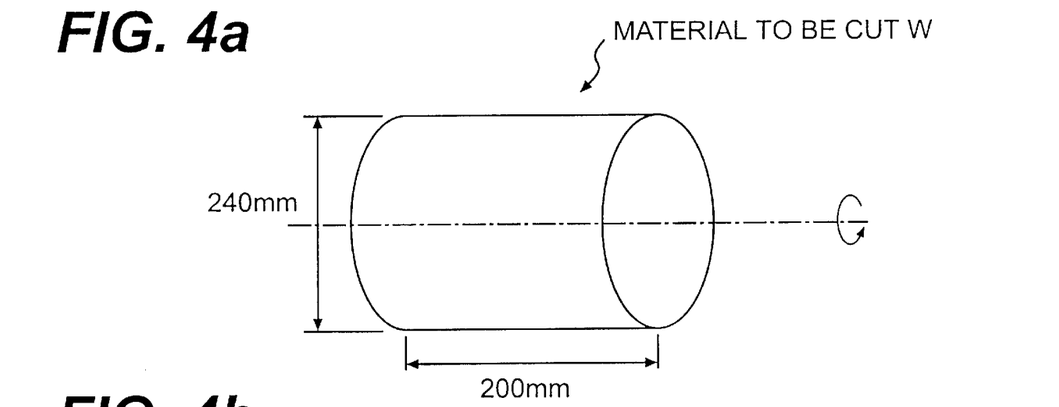
FIG. 4a, b and c are explanatory diagrams showing the summary of the cutting tool.
Figure 4B:
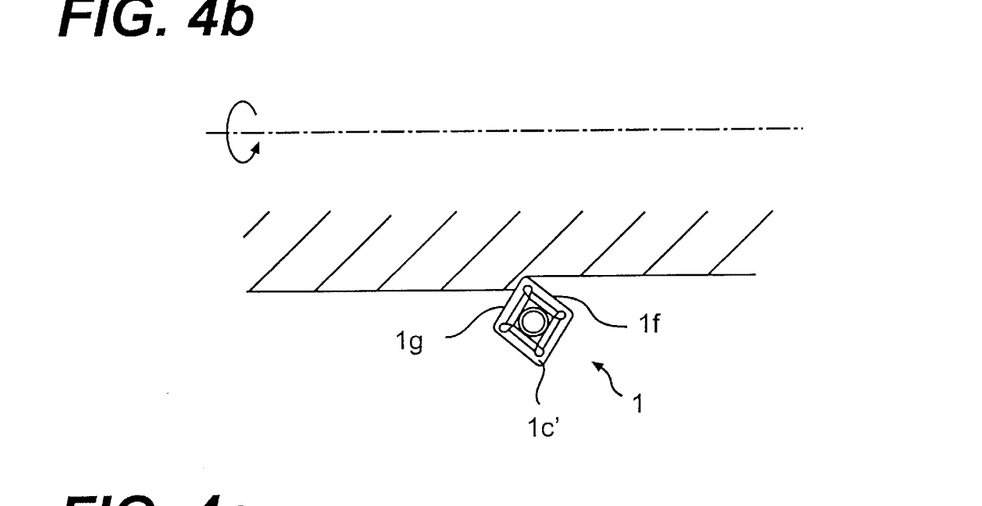

The evaluation conditions for the cutting performance of the tools are as follows. A material to be cut W in the form of a rod was rotated around an axis as shown in FIG. 4(a). The tool 1, shown in FIG. 3, was brought into contact with the outer circumferential surface thereof as shown in FIG. 4(b). One of the primary planes 1c was used as a rake face (hereinafter the rake face is denoted by 1c'), and the side plane 1e (FIG. 3) was used as a flank face, so that the outer circumferential surface of the material to be cut W was continuously cut under the following conditions.

Figure 4C:
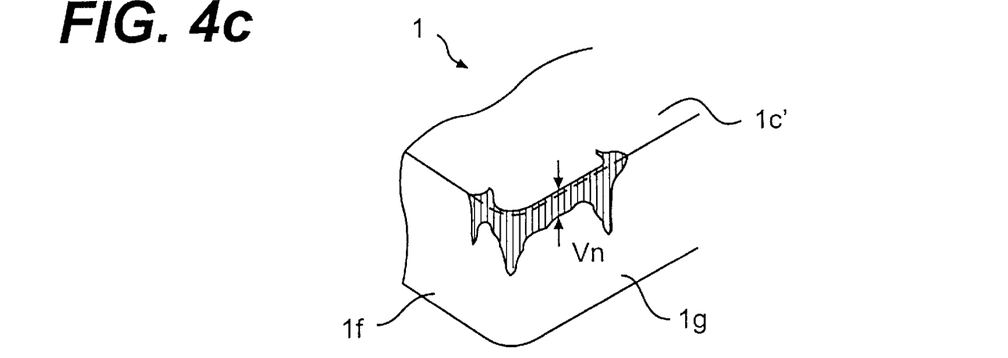
Figure 5A:
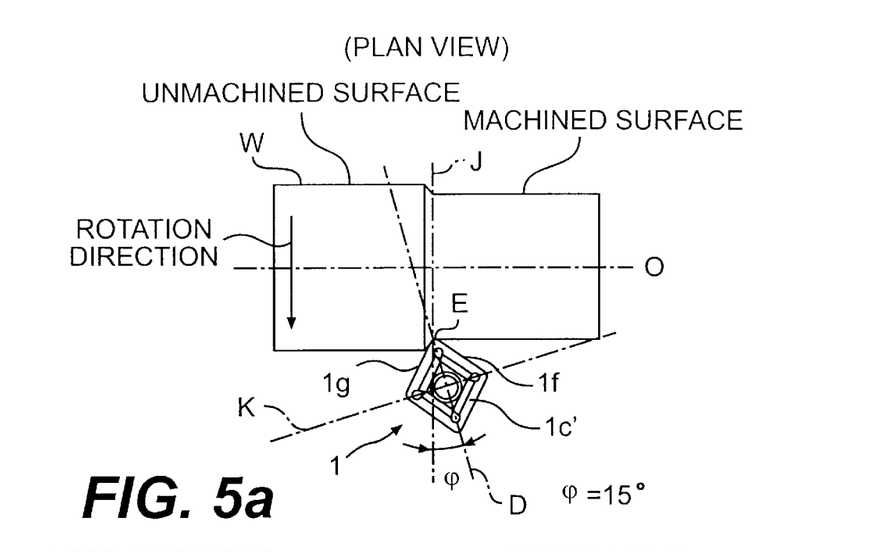
Figure 5B:
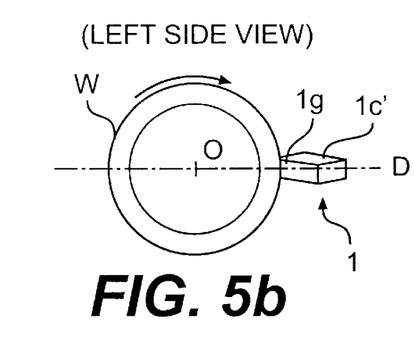
Figure 5C:
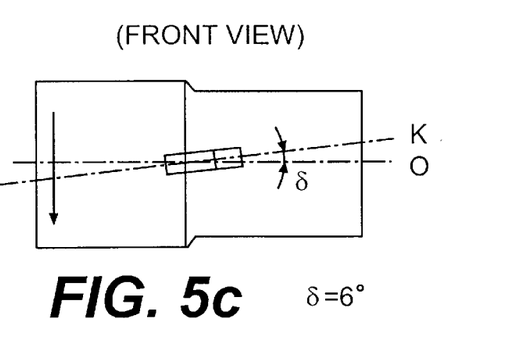

Material to be cut: Mn steel for machine structure (SNCM439) having a round rod shape (outer diameter: 240 mm, length: 200 mm, hardness: HB300)
Cutting speed V: 300 m/min
Feed f: 0.1 mm per rotation
Depth of cut d: 1.5 mm
Cutting oil: none
Cutting time: 4 minutes The detailed relationship of the positions of the test piece 1 and the material to be cut W was as shown in FIG. 5. In this figure, symbol 1g denotes a side flank face, and 1f denotes a front flank face. The meanings of the other symbols are shown in the figure. After completing the cutting, the wear amount Vn of the flank face at the tip of the tool 1 (the wear height in the cutting direction on the side of the side flank face 1g, see FIG. 4(c)) was measured. The wear distinction property of the corner part used for cutting was confirmed by the naked eyes. The results are shown in Table 5.

Accordingly, it is understood that the cermet tools other than Samples Nos. 5 and 6 exhibit good wear resistance properties. It is understood that the judgement of the worn part by the naked eyes can be conducted when at least one of the appearance lightness Vs and the saturation Cs of the surface coating layer satisfy Vs of 6 or more and Cs of 4 or more. On the other hand, when the hue of the interior of the cermet (main body part) having been mirror polished was determined by using the color sample, the sample employing the compositions A in Table 1 exhibited a lightness of 5 and a saturation of N, and that employing the composition B exhibited a lightness of 4 and a saturation of N. N under saturation refers to neutral or achromatic i.e. without color such as gray.

While the invention has been described in connection with its preferred embodiments, it should be recognized that changes and modifications can be made therein without departing from the scope of the appended claims.

TABLE 1

| | | | Component | | | | | |
|---|---|---|---|---|---|---|---|---|
| Kind | TiC | TiN | TiCN | NbC | TaC | WC | $Mo_2C$ | Ni | Co |
| A | 34.5 | 22.5 | — | 4.5 | — | 18 | 8.5 | 4 | 8 |
| B | — | — | 57 | — | 4.5 | 16.5 | 7 | 5 | 10 |

(unit: percent by weight)

TABLE 2

| | Temperature increasing atmosphere until 1,200° C. | Sintering atmosphere | Sintering temperature (° C.) | Cooling atmosphere | Average cooling rate until 1,300° C. (° C. per minute) | Mixture composition |
|---|---|---|---|---|---|---|
| 1 | vacuum (2 × 10⁻² torr) | 1 torr $N_2$ | 1,600 | 650 torr $N_2$ | 10 | A |
| 2 | vacuum (2 × 10⁻² torr) | 260 torr Ar | 1,600 | 100 torr $N_2$ | 10 | A |
| 3 | 1 torr $N_2$ | 260 torr Ar | 1,600 | 650 torr $N_2$ | 10 | B |

TABLE 2-continued

| | Temperature increasing atmosphere until 1,200° C. | Sintering atmosphere | Sintering temperature (° C.) | Cooling atmosphere | Average cooling rate until 1,300° C. (° C. per minute) | Mixture composition |
|---|---|---|---|---|---|---|
| 4 | 10 torr N₂ | 260 torr Ar | 1,600 | 260 torr N₂ | 10 | B |
| 5 | 1 torr N₂ | 260 torr Ar | 1,600 | 650 torr N₂ | 10 | A |
| 6 | 1 torr N₂ | 260 torr Ar | 1,600 | 750 torr N₂ | 5 | B |
| 7 | 10 torr N₂ | 260 torr Ar | 1,600 | 260 torr N₂ | 10 | B |
| 8 | 10 torr N₂ | 260 torr Ar | 1,600 | 260 torr N₂ | 10 | B |
| 9 | 10 torr N₂ | 260 torr Ar | 1,600 | 260 torr N₂ | 10 | B |
| 10 | 10 torr N₂ | 260 torr Ar | 1,600 | 260 torr N₂ | 10 | B |

TABLE 3

| | Mixture composition | Surface coating layer composition (wt %) | | | | | | | |
|---|---|---|---|---|---|---|---|---|---|
| | | Ti | Nb + Ta | W | Mo | WR1 | Ni | Co | WB1 |
| 1 | A | 59.9 | 5.3 | 22.5 | 10.6 | 98.3 | 0.6 | 1.1 | 1.7 |
| 2 | A | 56.8 | 5.1 | 21.3 | 10.1 | 93.3 | 2.2 | 4.5 | 6.7 |
| 3 | B | 60.9 | 5.7 | 21.0 | 9.0 | 96.6 | 1.1 | 2.3 | 3.4 |
| 4 | B | 55.6 | 5.2 | 19.2 | 8.2 | 88.1 | 4.0 | 7.9 | 11.9 |
| 5 | A | 54.7 | 4.9 | 20.5 | 9.7 | 89.8 | 3.4 | 6.8 | 10.2 |
| 6 | B | 62.3 | 5.8 | 21.5 | 9.2 | 98.8 | 0.4 | 0.8 | 1.2 |

| | Mixture composition | Main body part composition (wt %) | | | | | | | |
|---|---|---|---|---|---|---|---|---|---|
| | | Ti | Nb + Ta | W | Mo | WR2 | Ni | Co | WB2 |
| 1 | A | 52.4 | 4.7 | 19.7 | 9.3 | 86.1 | 4.7 | 9.3 | 14.0 |
| 2 | A | 52.7 | 4.7 | 19.8 | 9.4 | 86.6 | 4.5 | 8.9 | 13.4 |
| 3 | B | 52.5 | 4.9 | 18.1 | 7.7 | 83.2 | 5.6 | 11.2 | 16.8 |
| 4 | B | 52.3 | 4.9 | 18.1 | 7.7 | 83.0 | 5.7 | 11.3 | 17.0 |
| 5 | A | 52.4 | 4.7 | 19.7 | 9.3 | 86.1 | 4.7 | 9.3 | 14.0 |
| 6 | B | 52.1 | 4.9 | 18.0 | 7.7 | 82.6 | 5.8 | 11.6 | 17.4 |

TABLE 4

| | Thickness of coating layer (μm) | WB1 (wt %) | WB2 (wt %) | WR1 (wt %) | WR2 (wt %) | WB1/WB2 | WB1/WR1 | WB2/WR2 | C (wt %) | N (wt %) | y/(x + y) |
|---|---|---|---|---|---|---|---|---|---|---|---|
| 1 | 5 | 1.7 | 14.0 | 98.3 | 86.0 | 0.12 | 0.017 | 0.16 | 9.0 | 5.1 | 0.36 |
| 2 | 2 | 6.7 | 13.5 | 93.2 | 86.5 | 0.50 | 0.07 | 0.16 | 9.0 | 5.1 | 0.36 |
| 3 | 3 | 3.4 | 16.8 | 96.6 | 83.2 | 0.20 | 0.035 | 0.20 | 7.7 | 6.1 | 0.44 |
| 4 | 2 | 11.9 | 17.0 | 88.1 | 83.0 | 0.70 | 0.14 | 0.20 | 7.7 | 6.1 | 0.44 |
| 5* | 2 | 10.2 | 14.0 | 89.8 | 86.0 | 0.73 | 0.11 | 0.16 | 9.0 | 5.1 | 0.36 |
| 6* | 5 | 1.2 | 17.4 | 98.8 | 82.6 | 0.07 | 0.012 | 0.21 | 7.7 | 6.1 | 0.44 |
| 7 | 3 | 9.9 | 17.1 | 88.1 | 81.4 | 0.58 | 0.11 | 0.21 | 7.7 | 6.1 | 0.44 |
| 8 | 3 | 9.9 | 17.1 | 90.1 | 81.4 | 0.58 | 0.11 | 0.21 | 7.7 | 6.1 | 0.44 |
| 9 | 3 | 9.0 | 17.1 | 90.1 | 81.4 | 0.53 | 0.10 | 0.21 | 7.7 | 6.1 | 0.44 |
| 10* | — | — | — | — | — | — | — | — | — | — | — |

*Measurement not conducted for 10

TABLE 5

| | Appearance hue | | | Wear amount (mm) | Distinction property of wear by the naked eyes | Note |
|---|---|---|---|---|---|---|
| | Hue | Lightness (V) | Saturation (C) | | | |
| 1 | 5Y | 8 | 14 | 0.13 | possible | — |
| 2 | 5Y | 7 | 12 | 0.1 | possible | — |
| 3 | 5Y | 6 | 10 | 0.08 | possible | — |
| 4 | — | 7 | N | 0.24 | possible | — |
| 5 | — | 9 | N | 0.23 | possible | Metallic gloss Occurrence of fusion |
| 6 | 5Y | 5 | 8 | x | possible | Pitching |
| 7 | 5Y | 8 | 14 | 0.06 | possible | TiN film formed |
| 8 | — | 8 | N | 0.05 | possible | TiN film formed |
| 9 | 5P | 5 | 4 | 0.05 | possible | TiAlN film formed |
| 10* | — | 4 | N | 0.10 | impossible | Sand blasted |

What is claimed is:

1. A cermet tool comprising:

a binder metallic phase forming component of Ni, or Ni and Co, and a hard phase including a hard phase metallic element component comprising Ti as its main part, and one or more of an additional metallic element component M selected from the group consisting of V, Cr, Zr, Nb, Mo, Hf, Ta and W, and said hard phase comprising a carbonitride of said hard phase metallic element component, a surface coating layer formed on a surface outermost part of said cermet tool, said surface coating layer comprising, one or more metallic elements among Ti, Al, V, Cr, Zr, Nb, Mo, Hf, Ta and W with Ti being necessary as a main component, at least one of a carbide, a nitride and a carbonitride of said metallic elements, and having an appearance lightness Vs and a saturation Cs in lightness defined in JIS Z8721 of said surface coating layer satisfying at least one of Vs of 6 or more and Cs of 4 or more.

2. A cermet tool as called for in claim 1, wherein said surface coating layer has an appearance exhibiting a substantially achromatic color or a chromatic color with a hue range of from 5 PB to 5 Y via 5 RP on a hue circle defined in JIS Z8721.

3. A cermet tool according to claim 1, wherein the surface coating layer is made of essentially the same elements as the hard phase and wherein the weight content of the binder metallic phase forming component in the surface coating layer is smaller than the average weight content of the binder metallic phase forming component throughout the remainder of the cermet tool.

4. A cermet tool according to claim 2, wherein a weight content WB1 of the binder metallic phase forming component in the surface coating layer of the cermet tool and a weight content WB2 of the binder metallic phase forming component of a main body part satisfies the formula $0.1 \leq WB1/WB2 \leq 0.7$.

5. A cermet tool according to claim 1, wherein said surface coating layer comprises the same material as the hard phase and binder phase and wherein the weight content of the binder phase forming component in the surface coating layer is smaller than an average weight content of the binder metallic phase forming component throughout the main body of the cermet tool.

6. A cermet tool according to claim 5 wherein a weight content WR1 of the hard phase metallic element component and a weight content WB1 of the binder metallic phase forming component in said surface coating layer and a weight content WR2 of the hard phase metallic element compound and a weight content WB2 of the binder metallic phase forming component of a main body satisfy the following equation $$0.005 \leq WB1/WR1 \leq 0.14$$

$$0.05 \leq WB2/WR2 \leq 0.2.$$

7. A cermet tool according to claim 1, wherein the metallic element components constituting the hard phase metallic element component in the surface coating layer and the main body part exhibit content ratios substantially the same as each other.

8. A cermet tool according to claim 1, wherein a thickness of the surface coating layer is between 0.5 and 5.0 μm.

9. A cermet tool according to claim 1, wherein the appearance of the surface coating layer does not exhibit a high degree of metallic gloss.

10. A cermet tool according to claim 9, wherein the appearance lightness Vs of the surface coating is greater than 6.

11. A cermet tool according to claim 9, wherein the saturation Cs is greater than 4.

12. A cermet tool according to claim 9, wherein the surface coating layer has a lightness Vs value of at least 7 and a saturation Cs value of at least 5.

13. A cermet tool according to claim 1, wherein the surface coating layer has an appearance exhibiting a substantially achromatic or a chromatic color having a hue range of from 5 PB to 5 Y via 5 RP on a hue circle defined in JIS Z8721.

14. A cermet tool according to claim 1 for high speed chip forming machining of metallic materials which includes:

a rake face over which chips formed during said chip forming machining of metallic materials will flow;

a flank face;

a cutting edge, for cutting into said metalic materials at high speeds to form said chips, formed at a junction of said rake face and said flank face;

wherein said surface coating layer covers at least said cutting edge.

* * * * *